Figure 1:
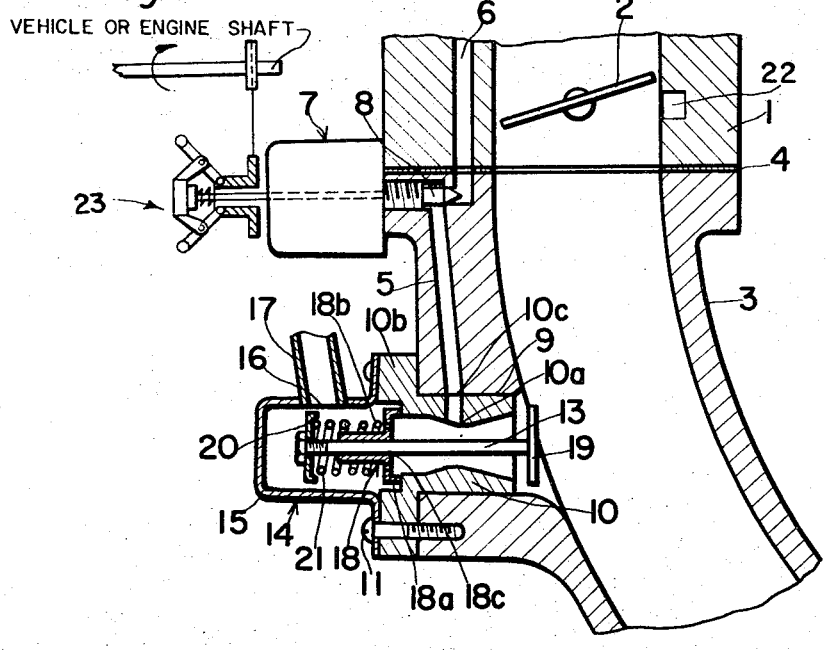

United States Patent

Tatsutomi et al.

[11] 3,782,346
[45] Jan. 1, 1974

[54] INTAKE SYSTEM FOR INTERNAL COMBUSTION ENGINE

[75] Inventors: Yasuo Tatsutomi; Shigetake Yoshimura, both of Hiroshima, Japan

[73] Assignee: Toyo Kogyo Co., Ltd., Aki-gun, Hiroshima-ken, Japan

[22] Filed: Mar. 29, 1971

[21] Appl. No.: 128,723

[30] Foreign Application Priority Data
Mar. 30, 1970  Japan.................................. 45/30590

[52] U.S. Cl...... 123/97 B, 123/119 D, 123/119 DB, 123/124 R
[51] Int. Cl............................................. F02m 7/04
[58] Field of Search .................. 123/119 D, 119 DB, 123/124 R, 124 A, 97 B

[56] References Cited
UNITED STATES PATENTS
3,503,594  3/1970  Goto ................................ 123/97 B
3,547,089  12/1970  Pierlot.............................. 123/97 B
3,554,173  1/1971  Masaki............................. 123/97 B

*Primary Examiner*—Wendell E. Burns
*Attorney*—Craig, Antonelli, Stewart & Hill

[57]  ABSTRACT

An intake system for an internal combustion engine which is effective to maintain the air-fuel mixture ratio at an appropriate value even when the engine is decelerated, so that complete combustion of the air-fuel mixture can be achieved with substantial elimination of noxious unburned compounds normally present in an exhaust gas emerged from the exhaust system of the engine. In addition, since complete combustion can be achieved, the occurrence of an after-burning in the exhaust system can be advantageously prevented.

19 Claims, 2 Drawing Figures

PATENTED JAN 1 1974  3,782,346

VEHICLE OR ENGINE SHAFT

INVENTORS

YASUO TATSUTOMI AND
SHIGETAKE YOSHIMURA

BY Craig, Antonelli, Stewart & Hill
ATTORNEYS

INTAKE SYSTEM FOR INTERNAL COMBUSTION ENGINE

The present invention relates to an improved intake system for an internal combustion engine and, more particularly, to an intake system for effectively reducing the amount of unburned compounds contained in an exhaust gas emerged from the exhaust system of an internal combustion engine while the latter is decelerated.

It has been generally known that, for a certain period of time immediately after an automobile internal combustion engine that has been normally driven is decelerated, the engine cylinder still receives a certain amount of fuel flowing through the fuel jet into the air stream within a carburetor under the influence of an inertia force, a certain amount of fuel flowing through the idling fuel port and a certain amount of fuel that has been wetted on the inner peripheral surface of the intake manifold, resulting in the increase of a mixture ratio of fuel to air. In this case, the increase of the mixture ratio of fuel to air constitute a cause for incomplete combustion of fuel in the engine cylinder or, in an extreme case, cause an ignition to be inoperative. As a result, an exhaust gas present in the exhaust system, such as an exhaust manifold or reactor, reacts with air present therein to effect an afterburning with explosion.

In order to avoid the after-burning occurring in the exhaust system of an internal combustion engine, various methods have been heretofore proposed; one of which is such that the provision has been made to supply a primary air to the intake manifold thereby to render the air-fuel mixture ratio to be appropriate when the engine is decelerated and another one of which is such that the thermal reactor has been disposed in the exhaust system so that the exhaust gas can be re-burned therein with the aid of a secondary air supplied to said reactor.

In the former case, it has been often experienced that the air-fuel mixture ratio is, so far from being adjusted to the appropriate value, diluted due to the fact that both fuel flowing through the jet into the air stream under the influence of an inertia force when the engine commences to be decelerated nor fuel to be wetted on the inner peripheral surface of the intake manifold has been eliminated for a certain period of time immediately after the engine is decelerated. Even in this case incomplete combustion occurs in the engine cylinder which in turn such unburned compounds as hydrocarbons, carbon monoxide and carbon dioxide are still emitted from the exhaust system.

In the latter case, the amount of the secondary air supplied to the reactor by means of an air pump is designed such as to be constant irrespective of the engine driving condition only if the engine is rotated at a constant rate. However, in practice, the amount of the secondary air to be supplied to the reactor is reduced due to a relatively high value of exhaust gas pressure present in the exhaust system when the engine is normally driven and increased due to a relatively low value of exhaust gas pressure when the engine is decelerated. In view of this fact, when and after the engine is decelerated, the air-fuel mixture ratio is diluted on one hand due to the primary air and on the other hand an excessive amount of the secondary air is supplied to the reactor, resulting in that the unburned compounds are exhausted to the atmosphere.

The present invention has been made in view to eliminating the above mentioned defects inherent in the conventional internal combustion engine and, accordingly, one object of the present invention is to provide an improved intake system for an internal combustion engine wherein means is provided for preventing the occurrence of after-burning in the exhaust system of such engine.

Another object of the present invention is to provide an intake system for an internal combustion engine wherein means for supplying a primary air to the intake system and means for supplying an additional fuel to the intake system are provided, said both means being adapted to operate when the engine is decelerated in association with each other to an end that incomplete combustion of fuel in the engine cylinder can be avoided.

A further object of the present invention is to provide an intake system for an internal combustion engine whereby, when the engine is decelerated, that is, when the engine is rotated at the speed smaller than the predetermined value and the vehicle speed is also smaller than the predetermined value, an additional fuel can be supplied to the intake system to reduce the amount of noxious unburned compounds present in an exhaust gas emerged from the exhaust system of the engine and, when the engine is rotated at the speed exceeding the predetermined value and the vehicle speed is in excess of the predetermined value, the supply of the additional of the predetermined value, the supply of the additional fuel to the intake system can be advantageously cut off to eliminate the waste of such additional fuel.

It is a related object of the present invention to provide an improved intake system for an internal combustion engine which advantageously contributes to the prevention of air pollution on which public attentions are now concentrated all over the world.

Figure 2:
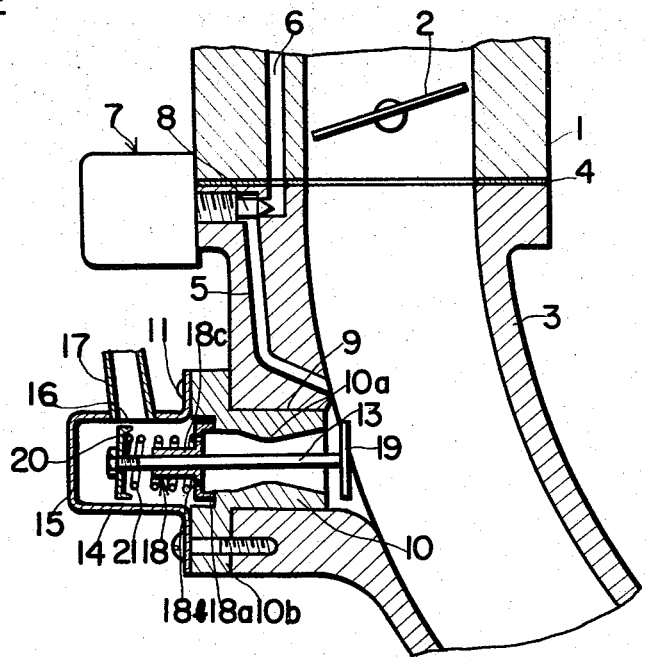

These and other objects and features of the present invention will be apparent from the following description taken only for the purpose of illustration thereof in conjunction with preferred embodiments shown in the accompanying drawings, in which;

FIG. 1 is a longitudinal sectional view of an essential portion of the intake system of an internal combustion engine, and FIG. 2 is a similar view to FIG. 1, showing another preferred embodiment of the present invention.

As is well known in the art, the internal combustion engine has its cylinder assembly connected with a carburetor by means of an intake manifold through which an air-fuel mixture adjusted within the carburetor is supplied to such cylinder assembly. Accordingly, for the sake of brevity, only portions of the carburetor and the intake manifold adjacent to each other are illustrated in the accompanying drawings wherein like parts are designated by like numerals throughout such drawings.

Referring first to FIG. 1, the carburetor is designated by 1 as including a throttle valve 2 therein. This carburetor 1 is connected at its lower end with the adjacent end of the intake manifold 3 as indicated by 4, the other end of said manifold 3 being connected with an inlet port (not shown) formed in the engine cylinder in communication with the combustion chamber.

In accordance with the teachings of the present invention, the intake manifold 3 is formed in its wall portion with an additional fuel passage 5 through which fuel is additionally supplied to the interior of the manifold 3, directly or indirectly as will be mentioned later, when the engine is decelerated. An upstream end of this fuel passage 5 is connected through a limiter valve, generally indicated by 7, with a conduit 6 formed in a wall portion of the carburetor 1 which is in turn connected with a suitable fuel source (not shown) such as fuel passage communicated with a known low speed jet such as schematically illustrated at 22 in FIG. 1.

This limiter valve 7 is, in the instance as shown, tightly threaded to the wall portion of the intake manifold 3 and has a valve member 8 in position to regulate the flow of fuel from the conduit 6 to the additional fuel passage 5. This limiter valve 7 is operable in response to the engine condition or the vehicle speed in such a manner that, when the engine is rotated at the rotational rate smaller than a predetermined value, for example, at 3,000 r.p.m. or when the vehicle speed is of the value lower than a predetermined value, for example, at 60 km/h, the communication between the conduit 6 and the passage 5 is achieved by means of the valve member 8 and that, when the engine is rotated at the rotational rate larger than the predetermined value or when the vehicle speed is of the value higher than the predetermined value, such communication can be broken off. A vehicle or engine shaft speed responsive governor arrangement is schematically illustrated at 23 for maintaining valve member 8 in the open position at low shaft speeds and in the closed position at high shaft speeds in a manner generally similar to the prior art governor arrangement illustrated in FIG. 2 of U.S. Pat. No. 3,272,191 to Walker.

Disposed in the wall portion of the intake manifold 3 is a bore 9 in which a venturi tube member 10 having a diametrically reduced portion 10a at an intermediate portion thereof is tightly inserted. This venturi tube member 10 formed on one end remote from the interior of the manifold 3 with a flanged portion 10b through which said tube member 10 is rigidly fitted to the wall portion of the manifold 3 by means of a plurality of screws 11. Slidably extending through said venturi tube member 10 is a piston rod 13 constituting a portion of a control valve, generally indicated by 14, of the construction as will be mentioned later, for controlling the flow of a primary air to the interior of the intake manifold 3.

The control valve 14 comprises an open-ended valve casing 15 formed with a air intake port 16 communicating to an air source (not shown) such as air cleaner by means of a conduit 17 and is air-tightly fitted to the flanged portion 10b by means of the common screws 11 which are employed to fasten the venturi tube member 10 to the wall portion of the manifold 3. Rigidly situated within the valve casing 15 is a supporter bushing 18 formed at one end adjacent to the tube member 10 with a collar 18a having therein a plurality of holes 18b for permitting the flow of air from the interior of the valve casing 15 to the interior of the venture tube member 10. This supporter bushing 18 has a through hole 18c of the diameter substantially equal to that of the piston rod 13 so that the latter can be slidably steadily supported.

One end of the piston rod 13 is rigidly provided with a valve member 19 having the surface area larger enough to close the adjacent opening of the venturi tube member 10 while the other end thereof is rigidly connected with a retainer member 20. The piston rod 13 is normally urged to the left by means of a compression spring 21 interposed between the retainer member 20 and the collar 18a of the supporter bushing 18 within the valve casing 15 so that the opening of the venturi tube member 10 adjacent to the interior of the manifold 3 is normally closed by the valve member 19.

Referring back to the description of the additional fuel passage 5, the other end of said passage 5 is communicated, in the embodiment shown in FIG. 1, with a port 10c formed in the venture tube member 10 in register with the diametrically reduced portion 10a and, in the embodiment shown in FIG. 2, with the interior of the intake manifold 3 at a position substantially above the opening of the venturi tube member 10.

In operation, assuming now that the engine driven at the rate of 6,000 r.p.m. is suddenly decelerated in response to the closing of the throttle valve 2, negative pressure of a relatively great value will be generated in the intake manifold 3. In this condition, since the pressure in the valve casing 15 is of the value substantially equal to the atmospheric pressure, the piston rod 13 can be suddenly moved to the right against the compression spring 21, permitting the flow of air from the air source to the interior of the manifold 3 through the holes 18b in a rapid manner.

On the other hand, since the limiter valve 7 is adjusted to communicate the flow of fuel from the conduit 6 to the passage 5 only when the rotational rate of the engine became less than 3,000 r.p.m., only the primary air can be supplied to the intake manifold 3 through the control valve 14 unless the rotational rate of the engine reaches at the value less than 3,000 r.p.m.

The primary air thus supplied to the intake manifold 3 through the control valve 14 acts to mix with a small amount of air-fuel mixture flowing from the carburetor 1 and a certain amount of fuel that has been wetted to the inner peripheral surface of the intake manifold 3, rendering the air-fuel mixture ratio to be appropriate to the engine condition for a certain period of time immediately after the engine is decelerated. Accordingly, it will be clearly understood that not only the occurrence of the after-burning in the exhaust system of the engine can be advantageously prevented, but also the amount of unburned compounds present in the exhaust gas emerged from the exhaust system can be advantageously reduced.

After a lapse of such certain period of time until the rotational rate of the engine reaches to the predetermined value at which the limiter valve 7 commences to operate so as to communicate the conduit 6 with the passage 5, the air-fuel mixture is somewhat diluted. However, although incomplete combustion occurs in the engine cylinder, this problem can be negligible in view of the fact that the engine is seldom maintained in the decelerated condition for a long period of time particularly while the vehicle is driven on the city street.

Subsequently, when the rotational rate of the engine reaches at the value substantially equal to or less than the predetermined value, say, 3,000 r.p.m., the limiter valve commences to communicate the conduit 6 with the additional fuel passage 5 whereby fuel from the fuel source can be additionally supplied to the port 10c of the venturi tube member 10 on to the interior of the latter. The fuel thus supplied to the interior of the venturi tube member 10 is mixed with the primary air flowing therethrough from the air source which is in turn injected toward the interior of the manifold 3 at a rapid rate. However, it is to be noted that the fuel wetted on the inner peripheral surface of the intake manifold 3 had been at this time wasted as hereinbefore described and that the air-fuel mixture is, therefore, diluted. Accordingly, with the supply of the additional fuel through the venture tube member 10, the appropriate air-fuel mixture ratio can be obtained, resulting in that complete combustion undergoes in the engine combustion chamber.

In the case where the engine is often decelerated while the rotational rate thereof is of the value smaller then the predetermined value such as often experienced in city drive, the valve member 8 of the limiter valve 7 is in position to permit the communication between the conduit 6 and the passage 5 so that the air-fuel mixture is concentrated for a certain period of time, for example, one second, immediately after the engine is decelerated. This is due to the supply of fuel that has been wetted on the inner peripheral surface of the manifold 3, fuel flowing from the carburetor under the influence of an inertia force and fuel supplied from the idling fuel port. Although unfavourable combustion will accordingly take place for this period of time, no after-burning will occur.

Thereafter, the mixture composed of the primary air and fuel supplied from the idling fuel port is more or less diluted for a subsequent period of time, for example, in the range of 20 to 30 seconds. However, during this period, the additional fuel is supplied to the intake manifold 3 to mix with the mixture so that the air-fuel mixture ratio can become appropriate. Accordingly, complete combustion takes place in the engine combustion chamber with elimination of the noxious unburned compounds present in the exhaust gas.

In the embodiment of FIG. 2, instead of the other end of the additional fuel passage 5 connected with the port 10c as shown in FIG. 1, said other end of the passage 5 is communicated directly with the interior of the intake manifold 3 at a position where negative pressure effectively acts. Even in this case, although the primary air and the additional fuel can be individually supplied to the intake manifold 3 at the same time when the engine is decelerated, the operation and advantage are substantially the same as hereinbefore fully discribed with reference to FIG. 1. However, if means for delaying the operation of the limiter valve in response to commencement of the deceleration of the engine for a certain period of time, for example, one second, is provided, it will be understood that only the primary air can be supplied to the intake manifold 3 for such period of time immediately after the engine is decelerated. Accordingly, even after commencement of the deceleration of the engine, the appropriate mixture ratio can be maintained so that the unburned compounds can be advantageously removed from the exhaust gas.

Although the present invention has been fully described in conjunction with the preferred embodiments thereof, it is to be noted that the value at which the limited valve is operated can be selectively determined depending upon the specification of the relevant engine. Furthermore, particularly in the second embodiment of the present invention, a control means for regulating the flow of fuel from the fuel source to the intake manifold 3 in such a manner that, when the engine rotational rate is of the value larger than the predetermined value, it acts to cut off such flow of fuel and, when smaller than the predetermined value, it acts to permit such flow of fuel may be disposed independent of the limiter valve 7 shown in FIG. 2 to achieve the same function as obtained by the first embodiment shown in FIG. 1.

What is claimed is:

1. An air-fuel intake arrangement for an internal combustion engine comprising: an air fuel intake channel leading to combustion chamber means of an engine, a carburetor for controlling the air-fuel mixture in said intake channel, said carburetor including a throttle valve arranged in said intake channel, primary air supplying means for supplying primary air to said intake channel during engine deceleration conditions, said primary air supplying means including a primary air passage with a primary air valve means arranged therein, said primary air passage having one end communicated with an air source and the other end open to the interior of said intake channel at a position downstream of said throttle valve, and additional fuel supplying means for supplying additional fuel to said intake channel during certain engine operating conditions, said additional fuel supplying means including a fuel passage with a fuel passage valve means arranged therein, said fuel passage having one end communicated with a fuel source and the other end communicating with said intake channel at a position downstream of said throttle valve, said fuel passage valve means including means operable to open said fuel passage during deceleration of said engine only when one of the engine speed and the speed of a vehicle powered by said engine is smaller than a predetermined value.

2. An arrangement according to claim 1, wherein said fuel passage valve means includes means for opening said fuel passage only when the engine speed is smaller than a predetermined value.

3. An arrangement according to claim 1, wherein said fuel passage valve means includes means for opening said fuel passage only when the speed of a vehicle powered by said engine is smaller than a predetermined value.

4. An arrangement according to claim 2, wherein said other end of said fuel passage opens into said primary air passage at a position in said primary air passage upstream of said intake channel with respect to said primary air passage, whereby fuel is intermixed with said primary air in said primary passage prior to flow of said primary air into said intake channel.

5. An arrangement according to claim 4, wherein the opening of said fuel passage into said primary air passage is upstream of the position in said primary air passage where said primary air valve means controls the opening of said primary air passage, whereby flow of fuel to said intake channel is precluded when said primary air valve means is closed.

6. An arrangement according to claim 5, wherein said primary air valve means includes means responsive to negative pressure in said intake channel for opening said primary air passage with respect to said intake channel.

7. An arrangement according to claim 2, wherein said primary air valve means includes means responsive to negative pressure in said intake channel for opening said primary air passage with respect to said intake channel.

8. An arrangement according to claim 5, wherein said primary air passage includes a portion constructed as a venturi tube member having a diametrically reduced section adjoined by a diverging section extending in the direction of said intake channel, and wherein the opening of said fuel passage into said primary air passage is at said reduced section, whereby said additional fuel and primary air mixture is fed to said intake channel at a relatively high speed.

9. An arrangement according to claim 4, wherein said primary air passage includes a portion constructed as a venturi tube member having a diametrically reduced section adjoined by a diverging section extending in the direction of said intake channel, and wherein the opening of said fuel passage into said primary air passage is at said reduced section, whereby said additional fuel and primary air mixture is fed to said intake channel at a relatively high speed.

10. An arrangement according to claim 3, wherein said other end of said fuel passage opens into said primary air passage at a position in said primary air passage upstream of said intake channel with respect to said primary air passage, whereby fuel is intermixed with said primary air in said primary passage prior to flow of said primary air into said intake channel.

11. An arrangement according to claim 10, wherein the opening of said fuel passage into said primary air passage is upstream of the position in said primary air passage where said primary air valve means controls the opening of said primary air passage, whereby flow of fuel to said intake channel is precluded when said primary air valve means is closed.

12. An arrangement according to claim 11, wherein said primary air valve means includes means responsive to negative pressure in said intake channel for opening said primary air passage with respect to said intake channel.

13. An arrangement according to claim 11, wherein said primary air passage includes a portion constructed as a venturi tube member having a diametrically reduced section adjoined by a diverging section extending in the direction of said intake channel, and wherein the opening of said fuel passage into said primary air passage is at said reduced section, whereby said additional fuel and primary air mixture is fed to said intake channel at a relatively high speed.

14. An arrangement according to claim 8, wherein said primary air valve means includes means responsive to negative pressure in said intake channel for opening said primary air passage with respect to said intake channel.

15. An arrangement according to claim 13, wherein said primary air valve means includes means responsive to negative pressure in said intake channel for opening said primary air passage with respect to said intake channel.

16. An arrangement according to claim 6, wherein said primary air valve means includes a closing member facing inwardly into said intake channel, and biasing means for normally maintaining said closing member in position to close said primary air passage with respect to said intake channel, the biasing means and closing member being so configured that increased negative pressure in said intake channel occurring during deceleration causes movement of said closing member against the force of said biasing means to open said primary air passage to said intake channel.

17. An arrangement according to claim 7, wherein said primary air valve means includes a closing member facing inwardly into said intake channel, and biasing means for normally maintaining said closing member in position to close said primary air passage with respect to said intake channel, the biasing means and closing member being so configured that increased negative pressure in said intake channel occurring during deceleration causes movement of said closing member against the force of said biasing means to open said primary air passage to said intake channel.

18. An arrangement according to claim 14, wherein said primary air valve means includes a closing member facing inwardly into said intake channel, and biasing means for normally maintaining said closing member in position to close said primary air passage with respect to said intake channel, the biasing means and closing member being so configured that increased negative pressure in said intake channel occurring during deceleration causes movement of said closing member against the force of said biasing means to open said primary air passage to said intake channel.

19. An arrangement according to claim 15, wherein said primary air valve means includes a closing member facing inwardly into said intake channel, and biasing means for normally maintaining said closing member in position to close said primary air passage with respect to said intake channel, the biasing means and closing member being so configured that increased negative pressure in said intake channel occurring during deceleration causes movement of said closing member against the force of said biasing means to open said primary air passage to said intake channel.

* * * * *